(12) United States Patent
Minne

(10) Patent No.: US 7,691,661 B2
(45) Date of Patent: Apr. 6, 2010

(54) METHOD OF FABRICATING A SURFACE PROBING DEVICE

(75) Inventor: Stephen C. Minne, Santa Barbara, CA (US)

(73) Assignee: Veeco Instruments, Inc., Plainview, NY (US)

( * ) Notice: Subject to any disclaimer, the term of this patent is extended or adjusted under 35 U.S.C. 154(b) by 744 days.

(21) Appl. No.: 11/120,553

(22) Filed: May 3, 2005

(65) Prior Publication Data

US 2005/0210967 A1 Sep. 29, 2005

Related U.S. Application Data

(62) Division of application No. 10/345,513, filed on Jan. 16, 2003, now Pat. No. 6,886,395.

(51) Int. Cl.
*H01L 21/302* (2006.01)

(52) U.S. Cl. .............................. 438/52; 438/48; 257/48; 257/E29.324

(58) Field of Classification Search .................... 438/52, 438/FOR. 432, 50, 51, 14, 461, 109, 48; 216/2, 11; 148/DIG. 159; 257/254, 417, 257/48, 415, E29.324
See application file for complete search history.

(56) References Cited

U.S. PATENT DOCUMENTS

| | | | |
|---|---|---|---|
| 4,916,002 A | 4/1990 | Carver | |
| 4,943,719 A * | 7/1990 | Akamine et al. | ............. 250/306 |
| 5,066,358 A | 11/1991 | Quate et al. | |
| 5,399,232 A | 3/1995 | Albrecht et al. | |
| 5,444,244 A * | 8/1995 | Kirk et al. | ........................ 850/9 |
| 5,540,958 A | 7/1996 | Bothra et al. | |
| 5,546,375 A | 8/1996 | Shimada et al. | |
| 5,581,083 A | 12/1996 | Majumdar et al. | |
| 5,838,005 A | 11/1998 | Majumdar et al. | |
| 5,929,438 A | 7/1999 | Suzuki et al. | |
| 5,969,345 A | 10/1999 | Williams et al. | |
| 6,156,216 A | 12/2000 | Manalis et al. | |
| 6,189,374 B1 | 2/2001 | Adderton et al. | |
| 6,227,519 B1 | 5/2001 | Yagi et al. | |
| 6,252,226 B1 | 6/2001 | Kley | |
| 6,328,902 B1 | 12/2001 | Hantschel et al. | |
| 6,337,477 B1 | 1/2002 | Shimada et al. | |
| 6,408,122 B1 | 6/2002 | Shimada et al. | |
| 6,487,515 B1 | 11/2002 | Ghoshal | |
| 2002/0066855 A1 | 6/2002 | Choi et al. | |
| 2004/0159786 A1* | 8/2004 | Cho et al. | .................... 250/307 |

FOREIGN PATENT DOCUMENTS

WO WO 99/58925 11/1999

* cited by examiner

*Primary Examiner*—Julio J Maldonado
(74) *Attorney, Agent, or Firm*—Boyle Fredrickson, S.C.

(57) ABSTRACT

A method of making a probe having a cantilever and a tip include providing a substrate having a surface and forming a tip extending substantially orthogonally from the surface. The method includes depositing an etch stop layer on the substrate, whereby the etch stop layer protects the tip during process. A silicon nitride layer is then deposited on the etch stop layer. An etch operation is used to release the cantilever and expose the etch stop layer protecting the tip. Preferably, the tip is silicon and the cantilever supporting the tip, preferably via the etch stop layer, is silicon nitride. A probe for a surface analysis instrument made according to the method includes a tip and a silicon nitride cantilever having a thickness defined during the deposition process.

28 Claims, 4 Drawing Sheets

METHOD OF FABRICATING A SURFACE PROBING DEVICE

CROSS REFERENCE TO A RELATED APPLICATION

The present application is a divisional of U.S. application Ser. No. 10/345,513, filed Jan. 16, 2003, now U.S. Pat. No. 6,886,395.

BACKGROUND OF THE INVENTION

1. Field of the Invention

This invention relates to a method of fabricating a surface probing device and the probing device produced thereby, and more particularly, to a method of fabricating a silicon tip supported by a silicon nitride cantilever for performing surface analysis on a sample.

2. Description of Related Art

Surface analysis methods have advanced to achieve atomic resolution using a probing tip of a surface probing device having an apex of atomic dimensions. The probing tip is usually a tapered silicon structure, often referred to as a stylus, with a base attached to a cantilever arm and a sharp apex that interacts with the surface being probed. More particularly, the parts of the surface probing device include a stylus, a cantilever arm and a mounting section. In addition, the surface probing device may have an electrical connection from the stylus, through the cantilever arm, and to external circuitry for monitoring surface characteristics in a particular mode of operation. Moreover, the probe device may also have a reflective coating on the cantilever arm to accommodate, for example, optical detection techniques. In general, the electrical connection and the reflective coating provide different ways to measure the response of the stylus apex to the surface being analyzed.

An apparatus that uses a surface probing device for surface analysis typically involves a scanning process. During the scanning process, the stylus apex responds to surface characteristics. The response is monitored and generally held constant through a feedback system that causes a slight change in the cantilever arm position. Two notable examples where these general principles apply are scanning tunneling microscopy (STM) and atomic force microscopy (AFM).

In STM, a stylus apex of atomic dimensions on a cantilever arm follows the contour of a sample surface. Electrons tunnel through a near-field vacuum between the conductive apex of the stylus and a conducting sample creating a tunneling current. The tunneling current is very sensitive to changes in the distance between the stylus apex and the conductive sample surface. A feedback system is used to monitor and control the tunneling current at a constant value. Optionally, an optical detection techniques such as interferometry or laser beam deflection can be used to measure the resultant cantilever arm deflection during scanning.

AFM uses a stylus that is mounted on a cantilever arm that has a small spring constant and scans a surface such that repulsive inter-atomic forces between the surface and the stylus apex cause deflections in the cantilever arm position. Again, a feedback system is used to monitor and control the forces between the tip and sample, and an optical detection technique such as interferometry or laser beam deflection are used to measure the resultant cantilever arm deflection during the scanning process. In AFM, different modes of operation may be employed. See, for example, U.S. Pat. No. 6,189,374, filed Mar. 29, 1999, assigned to the present assignee, and entitled *Active Probe For An Atomic Force Microscope And Method Of Use Thereof*.

Several methods for fabricating surface probing devices with a stylus and a cantilever arm have been reported. Bothra et al., U.S. Pat. No. 5,540,958, describe a method for making a stylus on a cantilever arm by first etching a silicon wafer with a mask to produce protruding shapes of a predetermined size and then depositing a second layer, such as silicon oxide, by electron cyclotron resonance. Shimada et al., in U.S. Pat. No. 5,546,375 describe making a stylus by forming a recessed cavity in a silicon wafer. The cavity is then used to define the structure of the stylus. In U.S. Pat. No. 5,399,232, Albrecht et al. describe a method of fabricating a cantilever arm and stylus again by forming a depressed area in a silicon wafer and using the depressed area to define the stylus shape. In U.S. Pat. No. 5,581,083, Majumdar et al. describe a method for producing a hole at the apex of a stylus. The method uses a voltage applied to a metal coated tip causing evaporation of the metal coating and exposing the underlying silicon apex. Manalis et al., in U.S. Pat. No. 6,156,216, describe a silicon nitride cantilever with a silicon tip but provide no way for making a tip useable for probe microscopy, nor a means to control the characteristics of the silicon tip while removing the silicon nitride covering.

As noted, the combination of a stylus and a cantilever arm is important for many modern surface probing methods. In addition, each method of analysis typically requires a stylus and a cantilever arm with properties tailored to the application at hand. A significant drawback in this regard is that known methods to fabricate silicon styluses supported by cantilever arms include making the cantilever arms from silicon using an etching process. One difficulty that can arise in fabricating surface probing devices with silicon cantilever arms is that the thickness of silicon is difficult to control by etching. Another drawback is that it is beneficial for some applications such as thermal measurement and electrical measurement to make surface probing devices that contain an electrically isolated stylus which can be connected to external circuitry through a conductive metal deposited on the cantilever arm.

Therefore, the field of fabricating such surface probing device is in need of a method for fabricating corresponding styluses and cantilever arms in which the thickness of the cantilever arm is easy to control during the fabrication process and which yields an electrically isolated silicon tip. Moreover, it is important that the stylus be extremely sharp or, alternatively, small. A typical state of the art silicon AFM probe tip has a radius of curvature smaller than 15 nm. However, cantilevers with lower spring constants, such as silicon nitride cantilevers typically have styluses with radii of curvature greater than 25 nm. This is due to the fact that silicon nitride tips are typically molded, thus yielding tips that are necessarily less sharp. Contrary to such silicon nitride tips, silicon tips can be readily sharpened via an oxidation step. Therefore, in applications that require the low force afforded by the silicon nitride cantilever, resolution due to stylus size must be sacrificed.

In sum, a method that workably combines a silicon tip with a silicon nitride cantilever is thus desired to achieve the benefits of both systems, i.e., a low force silicon nitride cantilever and a sharp silicon tip.

SUMMARY OF THE INVENTION

The preferred embodiment overcomes the drawbacks of known methods by providing a method of fabricating a probing device having a cantilever arm that is composed of silicon nitride and which is useful as a low force cantilever sensor. Moreover, the resultant probing device (i.e., probe) has a silicon tip which, in addition to being made of silicon, has a very sharp stylus apex.

According to one aspect of the preferred embodiment, a method of making a probe having a cantilever and a tip includes providing a substrate having a surface and forming a tip extending substantially orthogonally from the surface. The method includes depositing an etch stop layer on the substrate, whereby the etch stop layer protects the tip during process. A silicon nitride layer is then deposited on the etch stop layer. An etch operation is used to release the cantilever and expose the etch stop layer protecting the tip. Preferably, the tip is silicon and the cantilever is silicon nitride and supports the tip, preferably via the etch stop layer.

In another aspect of the preferred embodiment, a method of making a probe includes the steps of providing a wafer and forming a stylus of predetermined width and height on a top surface of the wafer. The method includes sharpening and protecting the stylus with silicon dioxide which, as a result, creates a silicon dixode layer. A silicon nitride is then deposited so as to have a defined thickness, and the stylus is revealed using an etch mask and a subsequent etch, wherein the etch is terminated on the silicon dioxide layer.

According to a further aspect of the preferred embodiment, a method of fabricating a scanning probe device includes forming a cantilever by a deposition process, and integrating a metal tip with the cantilever.

According to yet another aspect of the preferred embodiment, a method of fabricating a scanning probe device comprises forming a cantilever including depositing a layer of a material and then integrating a thermocouple with the cantilever after the depositing step.

In a further aspect of the preferred embodiment, a method of fabricating a scanning probe device includes forming a layer of material and integrating an optical element with the layer, wherein the optical element is accessible from a side opposite a side on which the optical element was integrated with the layer.

In a still further aspect of the preferred embodiment, a method of producing a probe includes forming a cantilever comprising a layer of a first material having a thickness defined by the deposition process, and forming a tip of a second material. In this case, the first and second materials are different, and the tip and the cantilever are coupled. The first material is preferably silicon nitride, while the second material may constitute the substrate material, such as the silicon of a silicon wafer. Alternatively, the second material could be a metal.

Another feature of the preferred embodiment includes a probe having a silicon tip and a silicon nitride cantilever. The tip is supported by the cantilever via an oxide layer.

According to another aspect of the preferred embodiment, a probe for a surface analysis instrument includes a tip and a silicon nitride cantilever. The silicon nitride cantilever is formed using a deposition process.

In another aspect of this embodiment, the tip is silicon and is oxidation sharpened. Moreover, the tip preferably includes a reflective element disposed on the cantilever that includes a front side and a back side. Notably, the reflective element may be disposed on the front side.

In the preferred embodiment, a method for making surface-probing devices can be used to produce devices whereby the silicon material is restricted to the stylus and mounting sections, and the cantilever arms are silicon nitride. An advantage of this method is that the silicon nitride layer is formed by a deposition process rather than by an etching process, thus allowing for better control of the cantilever arm thickness over silicon arms that must be produced using an etching process. Importantly, the preferred method provides flexibility in the fabrication of silicon nitride cantilever arms so that corresponding spring constants can be engineered for specific applications. Additionally, by providing an electrically isolated silicon stylus, the probing device is particularly useful, for example, where small currents are being measured.

In process, a silicon stylus is formed on the top working surface of the wafer by etching the wafer. Once the stylus has been formed, the stylus or the apex of the stylus can be ion implanted to alter the chemical composition. To ensure that the silicon stylus is sharp, the silicon will be oxidation sharpened according to known techniques prior to the deposition of the silicon nitride layer. This oxide layer will also serve as an etch stop when etching the subsequently deposited silicon nitride layer. This etch stop will prevent damage to the silicon stylus during the silicon nitride removal and ensure the requisite sharp stylus. Notably, this oxide layer can also be used as protection during the final cantilever release. This can be quite important because the release process will likely damage the stylus if it is not protected. Using the integrated etch stop is a far better alternative over trying to protect the tip with an additional process step. Using the original passivation will never expose the fragile tip until all processing is complete, and this will result in a higher quality tip and better yield.

A silicon nitride layer is then deposited over the silicon dioxide covered silicon stylus and top working surface of the wafer. At this point, an optional reflective metal coating can be applied and optionally patterned on the front side of the wafer. A protective etch mask is applied on the silicon nitride layer, including over the silicon nitride covered silicon stylus. The properties of the resist and its application are engineered to deposit a thickness of resist less than the height of silicon stylus. The process of controlling deposition thickness is well known to those familiar in the art.

The silicon nitride covered silicon stylus is then etched to expose a desired underlying portion of the silicon dioxide covered silicon stylus apex. The etch will consume some of the protective resist, so if there is slight coverage of the apex this will be removed and it will not interfere with the process. This process can be repeated multiple times in order to fully "clear" the stylus apex without damaging the wafer surface silicon nitride. Notably, in the final iteration of the resist application, the cantilever can also be lithographically defined.

A silicon stylus supported on a silicon nitride cantilever arm is then made by etching the bottom surface of the wafer away in the region where the cantilever is desired. The etch is stopped when the field silicon is completely consumed and only the stylus silicon remains. The protective oxide layer is then removed in an etch that is highly selective to silicon nitride and silicon.

A reflective coating can then optionally be applied to the back side of the cantilever to facilitate optical detection techniques. Note that the reflective coating can optionally be applied, in process, on the front side of the cantilever as highlighted previously.

In another embodiment, a metal stylus supported by a silicon nitride cantilever can be formed by following the above process through the etching of the bottom surface of the cantilever. In this embodiment the bottom surface is fully etched, including the stylus. Since the stylus is completely etched, application of the silicon dioxide layer is optional. If the silicon dioxide layer is used, the silicon dioxide protective layer is then removed, typically using an appropriate etch. Metal is then deposited from the back side of the device. As metal is deposited on, and through, the silicon nitride aperture, the aperture closes. The result of the deposition will be the formation of a metal tip with electrical contact to the base of the cantilever.

By subsequently depositing a different metal onto the front side of the silicon nitride cantilever with metal stylus, a thermally sensitive stylus can be formed. It is well known that dissimilar metals in contact will produce a voltage that is proportional to temperature. In this configuration, the dissimilar metals touch only at the apex. Contact is made to each metal from the front and back sides of the cantilever mounting section, respectively.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

The preferred embodiment is directed to etching the top working surface of a wafer to form a silicon stylus with a predetermined geometry. Here and throughout the descriptions, working surfaces refer to the surfaces of interest that a specified operation is being performed on. For ease of presentation, "top" refers to the working surfaces of the wafer that are part of the silicon stylus formed or to be formed, while "bottom" refers to working surfaces that are not part of the silicon stylus to be formed or formed. The wafer is typically either a silicon wafer, a p-doped silicon wafer, an n-doped silicon wafer, a p-doped silicon-on-insulator (SOI) wafer or a n-doped silicon-on-insulator wafer.

Figure 1A:
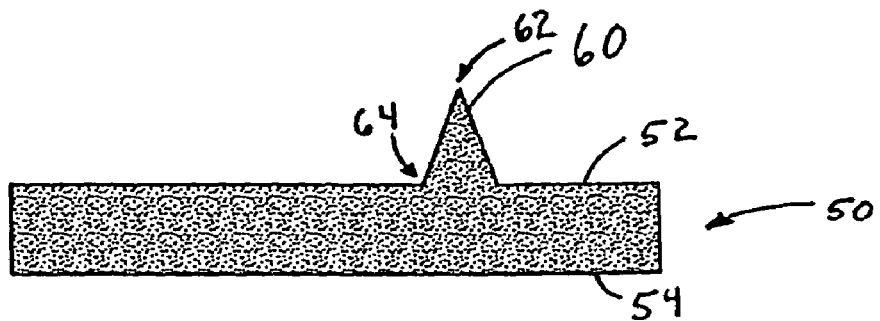
FIGS. 1A-D are side elevational views of a probe device being produced according to a preferred embodiment, including showing the steps for making a silicon nitride layer with a protruding silicon stylus and back side reflective coating.

FIGS. 1A-1D show steps for making a silicon nitride layer with a protruding silicon stylus. A wafer 50 is provided with a top silicon working surface 52 and a bottom silicon working surface 54. The wafer 50 is a silicon wafer or a silicon-on-insulator wafer. In the case shown, the wafer is a silicon wafer that is p-doped, n-doped or un-doped silicon. The top working surface 52, as shown in FIG. 1A, has been etched, according to known techniques, the details of which are readily available to produce a silicon stylus 60 with a height from 0.1 µm to 50 µm, but typically about 10 µm. The silicon stylus 60 is a tapered silicon structure that has an apex 62 and a base 64, as shown in FIG. 1A.

Note that the silicon stylus 60 can be doped at any time during the method described when the silicon stylus or stylus apex is exposed. The preferred method for doping the stylus is by ion implantation, but any known method may be employed. Notably, doping is useful for altering the conductivity of the tip itself. There are many reasons to control the conductivity including reducing electrostatic effects during dynamic operation, and having the ability to use the tip as an electrical ohmic point probe or an electric field probe. When using the tip 60 in such electrical applications, a metal element (not shown) may be connected from the tip 60 to the die or probe mount (not shown) in order to facilitate connection to the instrument. Doping may also be changed in order to use the high doping as an etch stop, for example, in order to make a "shell" tip. It is well known that silicon highly doped with boron is an effective etch stop in silicon anisotropic etches (i.e., KOH, EDP, TMAH). By intensely boron doping the tip, the body of the tip can be etched away from the back side, leaving only the outside shell of the tip. This is advantageous because it will reduce the mass of the tip without affecting its functionality. Operationally, the benefit of a lower mass tip is that it will cause the resonant frequency of the device to increase. Higher resonant frequency cantilevers, with similar spring constants, have been shown to provide higher resolutions and faster responses when used as sensors.

Figure 1B:
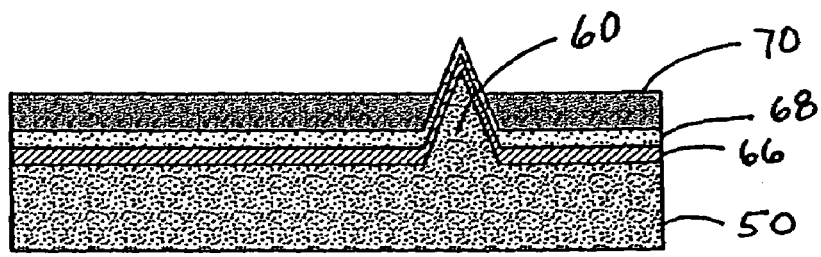

Turning to FIG. 1B, a silicon dioxide ($SiO_2$) layer 66, is grown over the wafer including the silicon stylus 60. This layer is grown in conventional fashion in a manner that will cause the silicon tip to become sharper. An example of this would be an oxidation step using steam at 950 degrees C., a well known process. The thickness of the resulting oxide layer should be great enough to serve as an etch stop for the subsequent silicon nitride etch. Typically, 0.25 nm is a preferred thickness for the oxide layer. A silicon nitride layer 68 is then deposited over the silicon dioxide layer 66. The silicon nitride layer 68 is deposited by one of a group including chemical vapor deposition (CVD), low pressure chemical vapor deposition (LPCVD), plasma enhanced chemical vapor deposition, chemical deposition, evaporation and sputtering, and is preferably 10 nm to 10 µm thick.

As will become apparent, it is the oxide layer 66 that operates not only as an etch stop but as an intermediate "bonding" layer between the silicon tip and the silicon nitride cantilever.

A protective coating 70 is then deposited on the silicon nitride layer 68. Preferably, coating 70 is a photoresist applied by spin coating, so that the coating thickness is less than the height of the silicon nitride covered silicon stylus 60. An additional lithography step, which clears any resist from the apex 62 of tip 60, could be used at this point.

More particularly, the height of the tip 60 is known from prior processing. And, the properties of the resist are typically well known by the manufacturer, with the resist typically being provided with a look-up table that contains values for the final resist thickness for different spin speeds and durations. Notably, even though the apexes of the tips may be covered by the initial application of the resist, the subsequent spin planarazation will clear them adequately. If this is a concern, a quick resist etch may be applied to clear any residual resist "scum" from the apex 62. This process will leave a very thin coating, to no coating, of resist on the apex of the stylus.

Figure 1C:
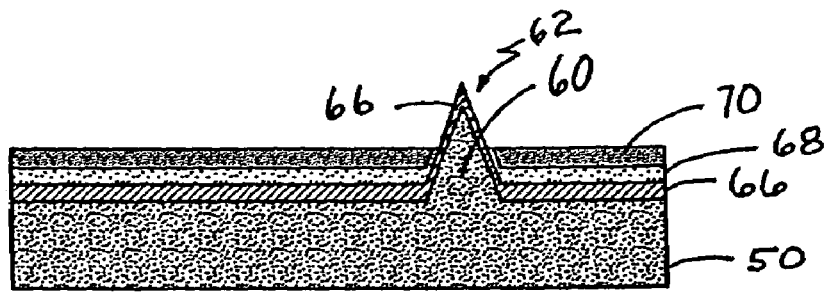

Turning to FIG. 1C, a silicon nitride covered silicon stylus 60 is etched to expose the underlying silicon dioxide layer 66, but not over-etched to the point that the silicon stylus 60 is exposed. The etch control is accomplished by knowing the etch rates of both the film being etched, the etch stop, and the etch mask of the particular etch tool being used. With these numbers, along with knowledge of the thickness of the film being etched, the etch stop, and the etch mask, a process window can be calculated that will give a range of etch times that will clear the stylus without clearing the etch stop or the etch mask. If these calculations do not yield an adequate etch window, the etch process or etch tool must be changed to increase the selectivity of the etch to the etch stop and the etch mask. This protects the apex 62 of the stylus 60 from this etch, and the subsequent cantilever release etch. In many cases, the combination of the etch selectivity between silicon nitride 68 and the resist 70, and the height of the silicon nitride coated stylus will require multiple coatings of resist 70 to be applied. This would occur if all the resist is etched off the wafer before the silicon nitride on the silicon stylus is completely removed. The old resist can optionally be stripped off and new resist applied, and the etch continued.

Notably, during the clearing of the apex it is often convenient to pattern the shape of the cantilever. This is done by standard photolithography either during the stylus clearing or in a subsequent lithography step. It should be noted that photoresist need only be used if lithography is employed. Otherwise polyimides, epoxies, waxes, etc. can be used for the tip definition. Also, consumption of resist by the etch can be used, in conjunction with the total resist thickness, to tailor the amount of the stylus 60 that will be exposed. After the stylus has been exposed by the etch, the remaining resist is removed from the top silicon working surface of the wafer in conventional fashion.

Figure 1D:
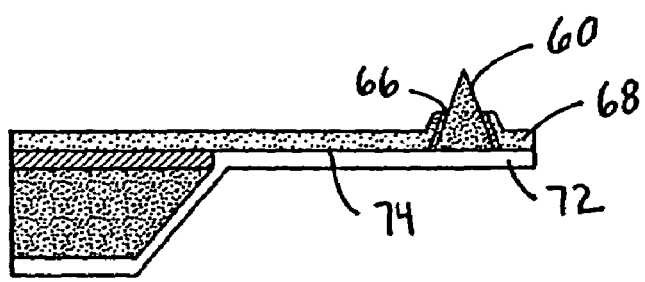

Turning to FIG. 1D, a device is now released by etching away the back side silicon. This etch is stopped when the silicon is removed from under the silicon nitride layer 68 (i.e., cantilever), but before the silicon stylus 60 is removed. In the case of an SOI wafer, the middle oxide is used as an etch stop.

The silicon dioxide layer 66 may then be removed. The protective oxide layer is preferably removed in an etch that is highly selective to silicon nitride and silicon, such as 6:1 buffered oxide etch, so that the characteristics of the tip (for example, sharpness) are not compromised.

As a result, the silicon dioxide is removed without unbonding the silicon tip 60 from the silicon nitride cantilever. In sum, an oxide layer 66 is inserted so that the tip 1) is protected to the end of the process (i.e., the oxide operates as a passivating layer), and 2) is coupled to the silicon nitride, albeit via the oxide. In the completed device, the tip 60 is cleared of oxide on its apex, but again not in the region that affixes the tip 60 to the silicon nitride 68. Therefore, the method removes the silicon nitride from the tip 60 while at the same time preserves the designed characteristics of the tip. Notably, because the oxide passivation layer protects the tip throughout the entire process, including the exposing of the apex, but also through the release of the cantilever structure, the step of releasing the cantilever 68 via the backside silicon wafer etch does not ruin the tip 60.

A reflective coating 72 may then be deposited on a back side 74 of the cantilever 68. Again, this coating 72 may serve multiple purposes including, for example, a surface for reflecting a laser beam toward a photodetector in an optical beam-bounce measurement apparatus. The reflective coating can optionally be applied, in process, on the front side of the cantilever. This is advantageous because the reflective coating can be patterned into a specific shape. An example of a useful shape would be a reflective coating near the free end of the cantilever but not on the base of the cantilever. This configuration also would minimize the residual bending of the cantilever due to stress in the applied reflective film, and bending from thermal effects.

FIGS. 2A-2D illustrate steps for making a silicon nitride layer with a protruding silicon stylus and a front side reflective coating. The process is the same as with respect to FIGS. 1A-1D, only now a reflective film 80 is deposited over the silicon nitride 68. This film 80 may or may not be patterned separately from patterning the cantilever structure. The film is patterned separately when the desired shape of the reflector is different from the desired shape of the cantilever. This may be done to optimize cantilever parameters such as stress or reflectivity. If patterned separately, it is removed from the stylus stack before the silicon nitride stylus clearing etch. If a separate lithography is not used, this reflective coating can be cleared in the same manner as the silicon nitride 68, only with a suitable etch. An additional lithography, which clears the resist 70 from the apex 62 of the tip 60, could be used at this point.

Notably, the process illustrated in FIGS. 2A-2D is contrary to conventional practice in, for example, producing probes for surface analysis tools such as an atomic force microscope. Again, in conventional production, the metal reflector is disposed on the back side of the cantilever in the final step of production because the laser used in the measurement apparatus (e.g., using an optical beam-bounce technique) is typically reflected off the back side of the cantilever. And, in conventional production, the last step is the first time the back side of the cantilever is revealed so it cannot be deposited earlier in the process.

Figure 2A:
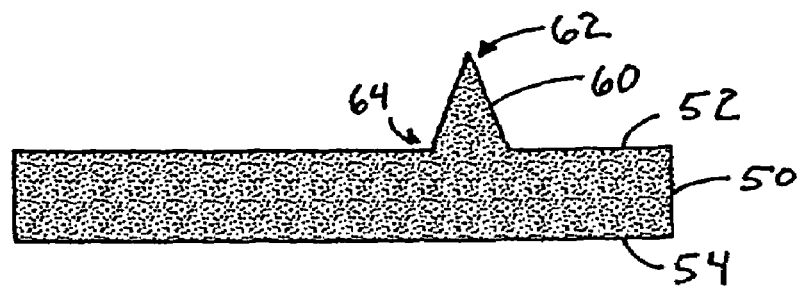
FIGS. 2A-D are side elevational views of a probe device of a preferred embodiment, including showing the steps for making a silicon nitride layer with a protruding silicon stylus and frontside reflective coating.
Figure 2B:
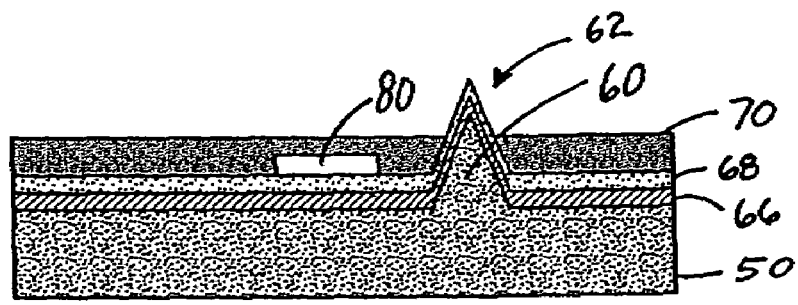
Figure 2C:
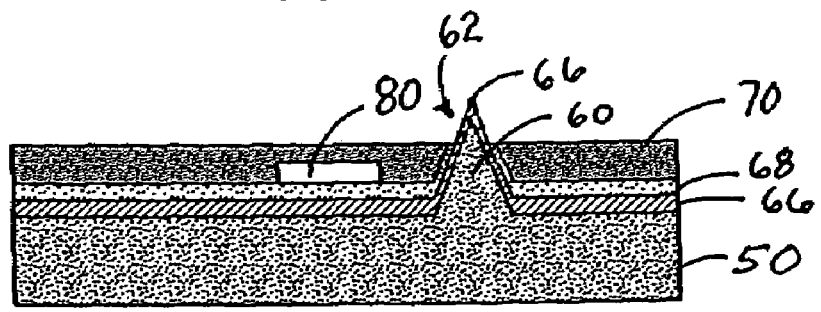
Figure 2D:
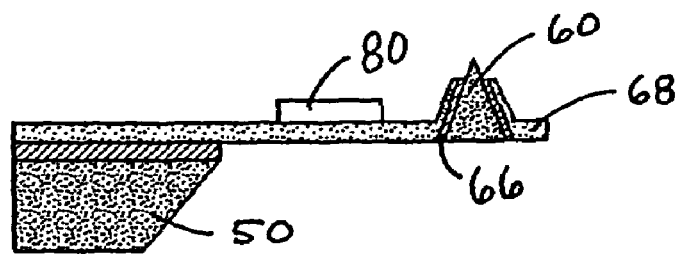

The result of the process illustrated in FIG. 2D is a reflector on the front side of the cantilever, disposed in process prior to the back side being revealed. Because the cantilever is transparent, a suitable reflector results, much how the metalization on a household mirror is disposed on the far side of the glass.

This technique has significant advantages including the fact that the metal reflector can be shaped, and thus can be kept separate from critical elements. Moreover, it is easier to process and more robust, and stress can be better controlled because the substrate is more stable. And, the process yields less worry about residual coating of the tip 60 because the reflective film 80 is actively etched away.

Moreover, this technique is particularly useful when producing thin cantilevers that need reflectors. The AFM industry, for one, seems to be moving towards thinner levers, and therefore thinners reflectors. This process of producing a front side reflector can offer improvements over bulk back side coating because, as noted above, by patterning the reflector just where you need it, you can eliminate stress problems and thermal drift problems.

Figure 3A:
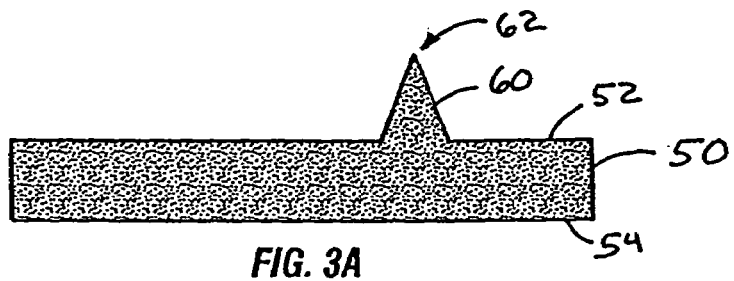
FIGS. 3A-D are side elevational views of a probe device of a preferred embodiment, including showing the steps for making a silicon nitride layer with a protruding metal stylus.
Figure 3B:
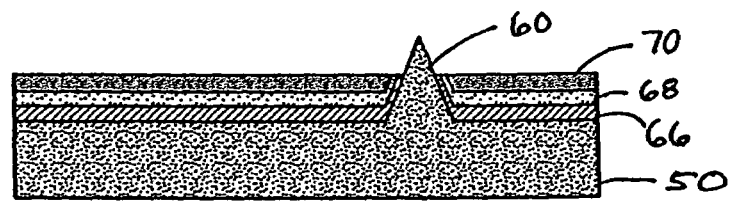
Figure 3C:
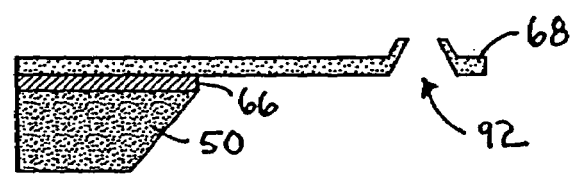
Figure 3D:
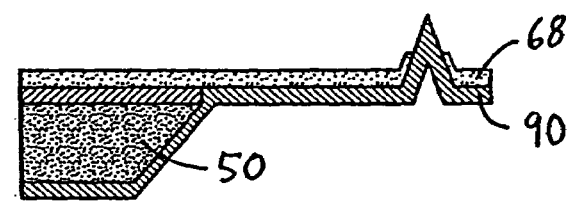

FIGS. 3A-3D illustrate the fundamental steps for making a silicon nitride layer with a protruding metal stylus 90. The same process is used as in forming the silicon stylus (FIGS. 1A-1D), only the etch is not stopped when the field silicon is clear, but when all the silicon is consumed, as shown in FIG. 3C. If an SOI wafer is used, an extra oxide etch must be inserted, as appreciated by those skilled in the art. A metal film 90 is then deposited from the back side of the cantilever until the hole or aperture 92 formed by the removed silicon stylus is filled with metal and metal protrudes beyond silicon nitride cantilever to define stylus or tip 90. The result of the deposition will be the formation of a metal tip 90 with electrical contact to the base of the cantilever. Notably, the metal tip will be self-sharpening to a degree. As the aperture closes the apex will come to a point. However, it typically is not nearly as sharp as the silicon tip. This is acceptable as "metal tip" applications usually do not require a tip as sharp as applications that require a silicon tip.

Figure 4A:
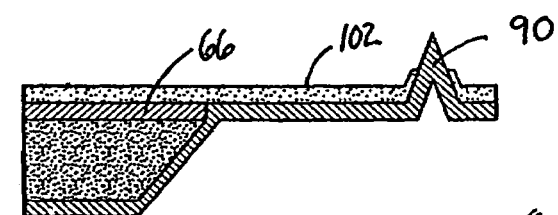
FIGS. 4A and 4B are side elevational views of a probe device according to a preferred embodiment, including showing the steps for making a silicon nitride layer with a protruding thermally sensitive stylus.
Figure 4B:
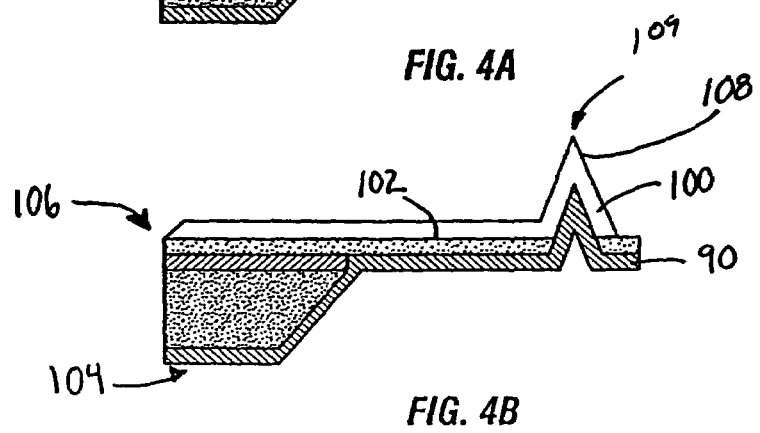

FIGS. 4A and 4B illustrate the fundamental steps for making a silicon nitride layer with a protruding thermally sensitive stylus. The structure of FIGS. 3A to 3D is formed and therefore the previous steps will not be repeated. Thereafter, a dissimilar metal 100 is then deposited on the front or top surface 102 of the cantilever. The junction of the two metals 90, 100, which only occurs substantially at the apex 110 of tip 108, forms a thermocouple. As previously noted, it is well known that dissimilar metals in contact will produce a voltage that is proportional to temperature. Electrical contact is made to the thermocouple from contacting the respective metals 90, 100 on the mounting section area 104, 106, respectively.

Figure 5:
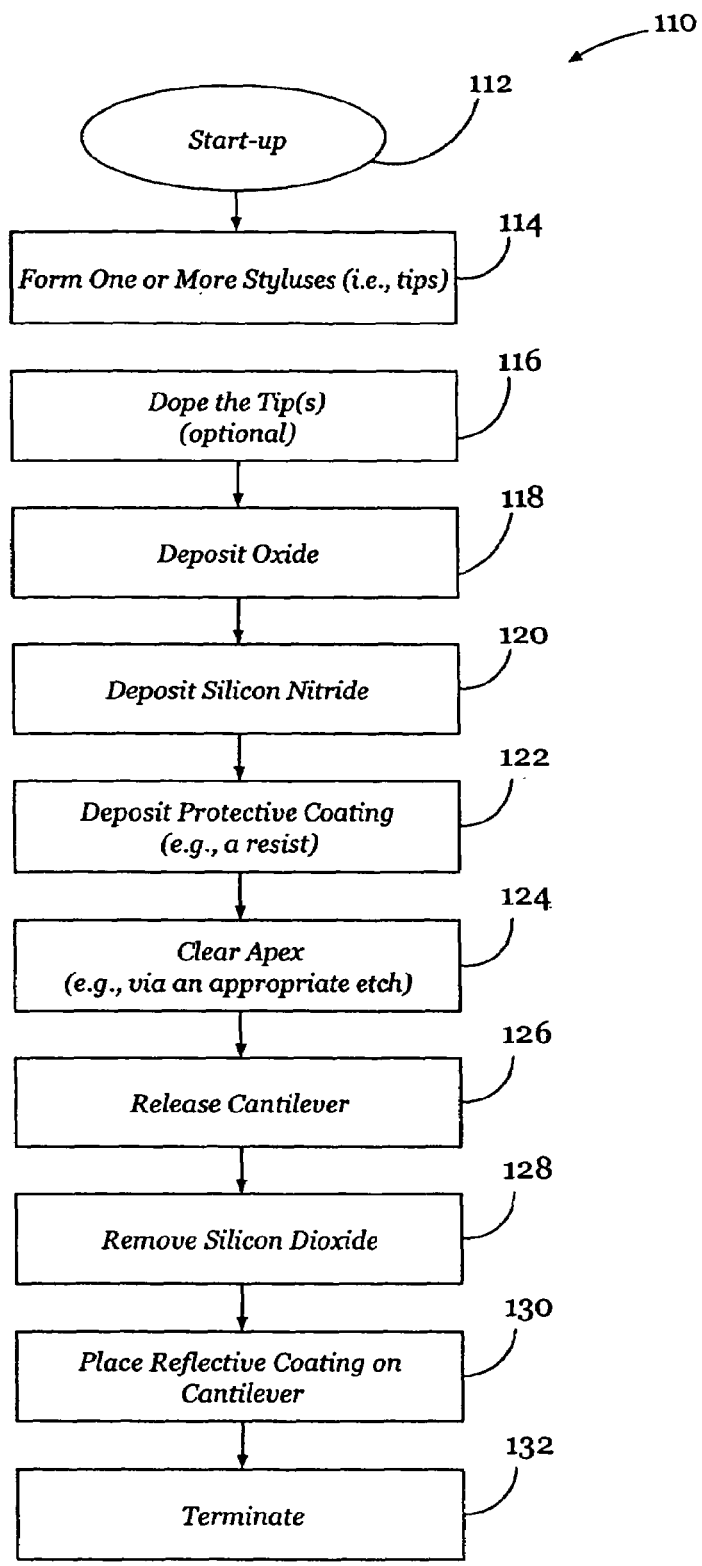
FIG. 5 is a flow diagram illustrating a method of producing a silicon nitride probe according to a preferred embodiment of the present invention.

Turning to FIG. 5, a method 110 of producing a silicon nitride cantilever having a silicon tip is shown. Initially, in Block 112, a substrate, such as a silicon wafer or a silicon-on-insulator wafer, is provided. Then, one or more tips or styluses are formed on the working surface of the substrate in Block 114. At this point, an optional doping step may be performed to alter the make-up of the silicon stylus(es) in Block 116, as described previously. Again, this doping step may be performed to alter electrical properties of the tip, or to form a "shell" tip, etc.

Next, in Block 118, an oxide layer is deposited on the top working surface of the substrate. Preferably, this oxide layer acts as a sharpening step that results in a silicon dioxide layer residing on the silicon substrate including the silicon tips. Then, a cantilever material layer (preferably, silicon nitride) is deposited on the silicon dioxide layer in Block 120. Once the silicon nitride layer is formed so as to provide a cantilever having a selected thickness, a protective coating is deposited on the top working surface in Block 122. Preferably, this is a spin coated resist that is deposited in conventional fashion.

In Block 124, the apex of the tip is cleared of the silicon nitride. This is accomplished by using an appropriate etch. Notably, the shape of the cantilever can be patterned in an optional operation as part of Block 124.

Importantly, upon completion of clearing the apex in Block 124, the protective silicon dioxide layer remains on the tip. In Block 126, the cantilever is released by etching away the silicon from the back side of the wafer. Notably, the integrity of the characteristics of the tip are maintained in this step due to the fact that the silicon dioxide layer remains on the tip.

Once the cantilever is released in Block 126, the silicon dioxide on the tip (and back side of substrate) is removed using an appropriate etch so as to not compromise the integrity (e.g., sharpness) of the tip in Block 128. Then, in Block 130, a reflective coating is deposited on the cantilever of the probe from the back side working surface. Of course, as highlighted above in discussing FIGS. 2A-2D, this reflective coating may be deposited on the front side working surface of the wafer during formation of the cantilever, after deposition of the silicon nitride layer in Block 120. Method 110 is terminated in Block 132, to produce a scanning probe device suitable for use in, for example, an atomic force microscope.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. The scope of still other changes to the described embodiments that fall within the present invention but that are not specifically discussed above will become apparent from the appended claims.

What is claimed is:

1. A method of making a probe having a cantilever and a tip, the method comprising the steps of:
   providing a substrate having a surface, the tip extending from the surface;
   depositing an etch stop on the substrate, the etch stop protecting the tip;
   depositing a cantilever material layer on the etch stop to form the cantilever; and
   performing an etch operation of the cantilever material to expose the etch stop protecting the tip; and
   removing part of the etch stop from the tip to expose the tip, wherein another part of the etch stop is maintained between the cantilever and the tip.

2. The method of claim 1, further comprising releasing the cantilever material layer to form the cantilever, the cantilever having a front side and a back side.

3. The method of claim 2, wherein said releasing step includes etching the substrate.

4. The method of claim 3, wherein the substrate is a silicon wafer, and said etching step includes not removing the tip silicon.

5. The method of claim 3, wherein the substrate is a silicon wafer, and wherein said etching step includes removing the tip silicon.

6. The method of claim 5, further comprising the step of depositing a first metal from the back side of the cantilever so as to form a metal tip.

7. The method of claim 6, further comprising depositing a second metal from the front side towards the cantilever so as to create a junction of the first and second metals at an apex of the metal tip.

8. The method of claim 2, further comprising removing the etch stop from the tip.

9. The method of claim 8, wherein said removing step includes using an oxide etch.

10. The method of claim 8, further comprising applying a reflective coating to the back side.

11. The method of claim 1, wherein said depositing an etch stop step sharpens the tip.

12. The method of claim 11, wherein the etch stop is silicon dioxide.

13. The method of claim 12, wherein the etch stop is less than about 0.30 nm.

14. The method of claim 1, further comprising the step of doping the tip.

15. The method of claim 14, wherein said doping step is performed prior to said depositing the etch stop step.

16. The method of claim 1, further comprising depositing a reflective coating on the cantilever material layer.

17. The method of claim 1, wherein said depositing the cantilever material layer is performed using CVD.

18. The method of claim 1, wherein the cantilever material layer is silicon nitride.

19. The method of claim 1, further comprising exposing the tip using multiple applications of an etch mask.

20. The method of claim 1, further comprising shaping the cantilever.

21. The method of claim 20, wherein both said exposing the tip and said shaping the cantilever steps are performed using the etch mask.

22. The method of claim 1, wherein the probe has a front side and a back side, and wherein the probe is electrically accessed through both sides.

23. A method of making a probe comprising the steps of:

providing a wafer including silicon;

forming a stylus on a surface of the wafer;

oxidizing the silicon;

depositing a silicon nitride layer to form a cantilever of the probe; and revealing the stylus using a subsequent etch, wherein the etch is terminated on at least part of the stylus, wherein the oxidized silicon is substantially removed from the apex of the stylus but is maintained between the cantilever and the stylus.

24. The method of claim 23, further comprising releasing the silicon nitride layer to form a cantilever having a back side.

25. The method of claim 24, further comprising applying a reflective coating to the back side.

26. The method of claim 23, wherein a reflective coating is formed prior to said depositing a silicon nitride layer step.

27. The method of claim 23, wherein said oxidizing step includes thermally growing an oxide to sharpen and protect the stylus.

28. The method of claim 27, wherein the oxide is silicon dioxide.

* * * * *